United States Patent
Schmucki

(10) Patent No.: US 9,755,455 B2
(45) Date of Patent: Sep. 5, 2017

(54) COMBINED SENSOR/EMERGENCY LIGHT UNIT FOR A LIGHTING SYSTEM

(75) Inventor: David Schmucki, Weinfelden (CH)

(73) Assignee: TRIDONIC GMBH & CO KG, Dornbirn (AT)

( * ) Notice: Subject to any disclaimer, the term of this patent is extended or adjusted under 35 U.S.C. 154(b) by 827 days.

(21) Appl. No.: 14/000,158

(22) PCT Filed: Feb. 16, 2012

(86) PCT No.: PCT/AT2012/000033
§ 371 (c)(1),
(2), (4) Date: Jul. 11, 2014

(87) PCT Pub. No.: WO2012/109686
PCT Pub. Date: Aug. 23, 2012

(65) Prior Publication Data
US 2015/0091383 A1    Apr. 2, 2015

(30) Foreign Application Priority Data

Feb. 17, 2011  (DE) .................. 10 2011 004 304
May 30, 2011  (DE) .................. 10 2011 076 714

(51) Int. Cl.
| | |
|---|---|
| *H05B 33/08* | (2006.01) |
| *H05B 37/02* | (2006.01) |
| *H02J 9/06* | (2006.01) |
| *H01R 13/24* | (2006.01) |
| *H02J 7/00* | (2006.01) |

(52) U.S. Cl.
CPC .......... *H02J 9/061* (2013.01); *H01R 13/2421* (2013.01); *H02J 7/0042* (2013.01); *H05B 37/0218* (2013.01); *H05B 37/0254* (2013.01); *Y10T 307/625* (2015.04)

(58) Field of Classification Search
None
See application file for complete search history.

(56) References Cited

U.S. PATENT DOCUMENTS

| | | | |
|---|---|---|---|
| 2003/0117803 | A1 | 6/2003 | Chen |
| 2008/0197790 | A1 | 8/2008 | Mangiaracina et al. |
| 2008/0246844 | A1 | 10/2008 | Chan |
| 2009/0180271 | A1 | 7/2009 | Jachmann |

FOREIGN PATENT DOCUMENTS

| | | |
|---|---|---|
| DE | 102005028206 A1 | 12/2006 |
| DE | 102009017213 A1 | 10/2010 |
| EP | 1689214 A1 | 9/2006 |

(Continued)

OTHER PUBLICATIONS

"DALI MSensor, Multisensor for DALI System", Dec. 10, 2010 (Dec. 10, 2010), pp. 1-6, XP055253744, Found on the Internet: URL: http://www.tridonic.com/com/de/download/data_sheets/DS_DALI_MSensor_de.pdf [found on Feb. 29, 2016].

*Primary Examiner* — Dedei K Hammond
(74) *Attorney, Agent, or Firm* — Volpe and Koenig, P.C.

(57) ABSTRACT

The invention relates to an emergency light unit for a lighting system, in particular an emergency light unit designed according to the DALI standard, having the following features: The emergency light unit is connected to a bus (2) of the lighting system, to a rechargeable store (17) of electrical energy, and to emergency lighting means (16).

7 Claims, 1 Drawing Sheet

(56) References Cited

FOREIGN PATENT DOCUMENTS

| GB | WO 03094579 A2 * | 11/2003 | ......... H05B 37/0254 |
|----|----|----|----|
| GB | 2404474 A | 2/2005 | |
| WO | 03/094579 A2 | 11/2003 | |
| WO | 2010009491 A1 | 1/2010 | |
| WO | 2010/115801 A1 | 10/2010 | |

* cited by examiner

COMBINED SENSOR/EMERGENCY LIGHT UNIT FOR A LIGHTING SYSTEM

FIELD OF THE INVENTION

The invention relates to an emergency light unit for a lighting system, in particular for a system according to the DALI standard, wherein the emergency light unit is provided with at least one lighting means, preferably at least one LED and one drive circuit, as well as a storage device for electrical energy.

BACKGROUND

The DALI standard ("DALI" stands for Digital Addressable Lighting Interface") was developed for modern lighting systems. This standard stipulates that a plurality of actuators, such as lighting units, light sensors and also emergency light units can be controlled from a central control via a DALI bus. The central control is connected to the DALI bus, in addition to command data, also a DC voltage with 9.5 Volts, or up to 22.5 Volts, which creates operating voltage for these actuators as they have no access to the AC voltage network, or are not supposed to be connected to it.

The DALI bus is thus an example of a databus which in the standby mode supplies voltage, in particular DC voltage.

In view of the fact that the DALI standard allows to connect up to 64 addressable actuators to the DALI bus, it is understood that one actuator can consume from the DALI bus a DC voltage for which the upper limit is 2 mA. The maximum allowable total current consumption is 250 mA. This still leaves room for some exceptions exceeding the upper limit.

The actuators which are still within the exception conditions are referred to as "DALI control devices". Among these devices are signal generators such as light sensors which often must be installed in a location in which a connection to the AC power grid is not possible or difficult. This means that these signal generators can independently communicate with each other, and that they can also have the multi-master capability, which is to say that several active masters may be present in one bus system. Such "DALI control devices" are currently often designed as so called multi-sensors, which means that they possess a combined functionality of various sensors, such as for example that of a light sensor, a presence sensor, a motion sensor, a movement sensor and/or a sensor for an IR interface.

Emergency lights which according to prior art were not connected to AC current are not included in "DALI control devices".

The task of emergency lights is to make sure that illumination will be still provided in case of a failure of the power supply for the participating actuators in the relevant space. That is why they are either provided for this purpose with a rechargeable device for storage of electrical energy, or they are connected to such a device. This device for storage of electrical energy is in the simplest case a capacitor, although most of the time it is a battery or a battery pack. The device for storage of electrical energy must be rechargeable again within 24 hours for normal operation of an emergency light, for example for a period of at least 3 hours. The current required for recharging the storage device with electrical energy was with emergency units according to prior art obtained with rectification from an AC power supply. A corresponding connection to the AC power supply must be therefore provided for this purpose.

SUMMARY

The object of the invention is to provide an alternative or an additional capability for charging the storage unit with electrical energy in an emergency unit.

The proposed solution is that the emergency unit is provided with a low voltage power supply connection to which DC bus voltage can be supplied in order to charge the storage unit with electrical energy.

Naturally, the bus can also be optionally used for unidirectional or bidirectional transfer of signals with the emergency light device. The capabilities of the DALI standards are also referred to in this respect.

Under the term "low voltage" should be in this case understood a voltage having an amplitude that corresponds to less than 20% of that of the power supply voltage.

A preferred embodiment of the emergency light unit can be provided with an emergency light unit having a drive circuit which is adapted to monitor the voltage at the low voltage supply connection, (low voltage=significantly lower than the supply voltage, preferably less than $20V_{DC}$), and to evaluate the voltage on the basis of the emergency light situation and long-term failure (long term=longer than the bit duration of the digital bus) and activate the lighting means accordingly. A power failure (loss of the low voltage DC power) is thus evaluated as an emergency light situation, which means that the drive circuit is activated for the lighting means which is associated with it.

The use of an emergency light unit having the features indicated above is in particular suitable for an emergency light which is provided with a bus supplying DC voltage in the standby mode. An emergency light unit can be further also connected by means of a bus signal generator, in particular a bus-compatible sensor module which is connected to the bus, so that for example the bus voltage is further connected to an emergency light unit that is integrated in the bus signal generator or is present separately from it.

In order to satisfy the conditions restricting current consumption according to the concept of the DALI standard, it is proposed that the emergency light unit be integrated with or connected to a so called DALI control device which is allowed to consume increased current from the DALI bus.

The combined sensor/emergency light unit designed in this manner fulfills two functions. It enables reduced manufacturing and assembly costs, while it also ensures that the restrictive conditions of the DALI standard will not be violated by recharging of the storage unit from the bus voltage.

It is advantageous when the emergency light unit, the DALI control device, the energy storage unit (rechargeable storage unit) and the emergency lighting means are arranged in a common housing.

The housing may be a hollow body which is upwardly open and adapted for attachment to the ceiling of the space to be illuminated, so that the optical sensor and the emergency lighting means protrude from the bottom of the housing.

It is preferred when the housing is designed as a rotationally symmetrical housing which preferably has the form of a truncated cone, so that the optical sensor is arranged a central position and surrounded by a plurality of annular LEDs forming the emergency light means.

Overall, this results in a combined bus-capable sensor/emergency light unit for a lighting system in which are arranged in a common housing:
- an emergency light unit,
- a storage device for electrical energy and
- an emergency light means, such as for example one or several LED(s), wherein the emergency light unit and the sensor module can be connected in the standby mode to a bus supplying voltage to the lighting system, and
the emergency light unit is connected to a storage device for electrical energy and to the emergency lighting means.

Further, the bus can, naturally, also optionally be used for unidirectional or bidirectional transmission of signals along with the emergency light unit and/or the sensor module, which can be provided with joint or separate bus addresses.

The emergency lighting means (16) can be activated with the combined sensor/emergency unit described above when:
(a) the power supply for the lighting system fails and/or
(b) the level of the light in the room is too low and the light sensors (19, 20) generate a corresponding output signal, and/or
(c) a corresponding switching command is transmitted from central control or from another location.

A characteristic of the operation of the emergency light unit described above or of the combined sensor/emergency light unit or of the emergency light system is that the storage device for electrical energy in the emergency light unit is charged with DC bus voltage.

Another independent operation aspect is that the emergency light unit detects a failure of supplied DC bus voltage and activates an emergency lighting means in response to that.

The term DC bus voltage in this case means a voltage which is applied to a control bus, which can be for example a DALI bus.

The invention also relates to a method for operating an emergency light unit, wherein the emergency light unit is powered from DC bus voltage of a control bus in order to supply voltage to a rechargeable energy storage device.

The invention also relates a method for operating an emergency light unit, wherein the emergency light unit detects a failure of supplied DC-bus voltage and activates an emergency lighting means in response to that.

Further embodiments of the invention are described in the dependent claims, wherein the content of the claims should be fully included in the disclosure of the specification.

BRIEF DESCRIPTION OF THE DRAWINGS

Embodiments of the invention will now be described below with reference to figures which show the following.

DETAILED DESCRIPTION OF THE PREFERRED EMBODIMENTS

Figure 1:
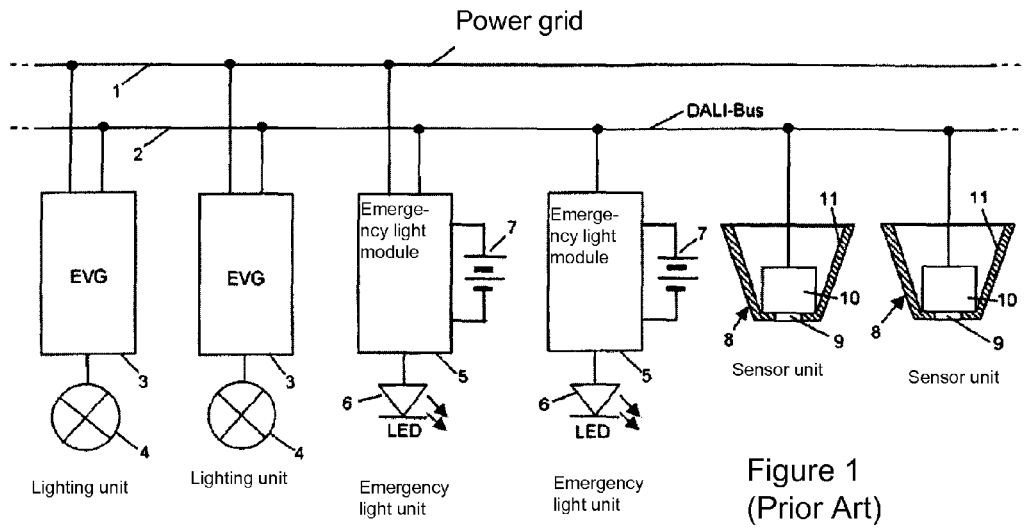
FIG. 1 shows a schematic representation of a lighting system according to the prior art.

The bus-compatible lighting system according to prior art which is shown in FIG. 1 is provided with a power line 1 and with a bus, for example a DALI bus 2. The power line 1 supplies AC voltage, for example 220-240 Volts. The DALI bus supplies in standby mode, a DC voltage of 9.5-22.5 Volts and thus provides a non-limiting example of a bus which supplies DC voltage at least in the standby mode.

The lighting system includes a plurality of addressable lighting units, while only two of them are indicated. Each lighting unit consists of one operating device 3 (electronic ballast device EVG in case of a discharge lamp), and one lighting means 4, which can be formed by a gas discharge lamp, an incandescent lamp, one or more LEDs or the like, and any combinations can thus be formed in this manner. Each operating device 3 is at the same time also connected with the AC power source 1 and with the DALI bus 2. The power to operate the lighting means 4 is obtained by the lighting units from the power grid 1; the switching commands are supplied through the DALI bus 2. It is understood that the lighting units will become inactive during a power failure. In addition, the voltage on the DALI bus is in such a case decreased to zero.

Furthermore, the lighting system also includes two sensor units (or light sensors) 8 which are connected only to the bus 2. Each sensor unit 8 is equipped with a housing 11 having the form of a truncated cone. The housing 11 is opened in the upward and closed in the downward direction. In the housing 11 is located a sensor module 10 which is connected on one side with the DALI bus 2 and on the other side with an optical sensor 9. This optical sensor passes through the lower end wall of the housing 11. Both light sensors 8 can communicate independently with each other. The power for operating the sensor module 10 is supplied from the DALI bus 2. Both light sensors form so called "DALI-control devices", which are allowed to draw more than 2 mA from the DALI bus 2.

Finally, the lighting system also includes two emergency light units 5 which are connected both to the power line 1 and to the bus 2. The emergency light unit 5 is further also connected to a rechargeable storage device 7 which has the form of a device for storage of electrical energy, or a battery or an accumulator. Each emergency light unit 5 is further also provided with a lighting means, for example of the form of at least one LED 6, which is connected with the emergency light unit 5.

The electrical energy required to operate the LED 6 is obtained by the emergency light unit 5 from the rechargeable storage device 7 for storage of electrical energy. The recharging of the storage device 7 is also performed via the emergency light unit 5, namely so that this power is drawn from the power line 1. The emergency light unit 5 converts internally the AC voltage from the power grid into a low-level DC voltage, which means that at least one rectifying element is required for this purpose.

The emergency light unit is switched on when the power supply to the lighting units is interrupted, so that the lighting units are disabled. Alternatively, the emergency light units can be activated when they receive a corresponding instruction through the DALI bus 2 from the central control. This may be the case when one of the sensor units 8 notifies the central control that the level of brightness is not sufficient in the monitored room. However, it is also possible that a corresponding notification may be transmitted directly from the sensor units 8 through the DALI bus 2 (which is to say without the involvement of the central control). Finally, there is also the option that the emergency units themselves detect the failure of the supply voltage and react accordingly. The emergency light units obtain the corresponding information directly from the power grid 1 of from the DALI bus 2 because the DALI DC voltage will be in this case also decreased to zero.

Figure 2:
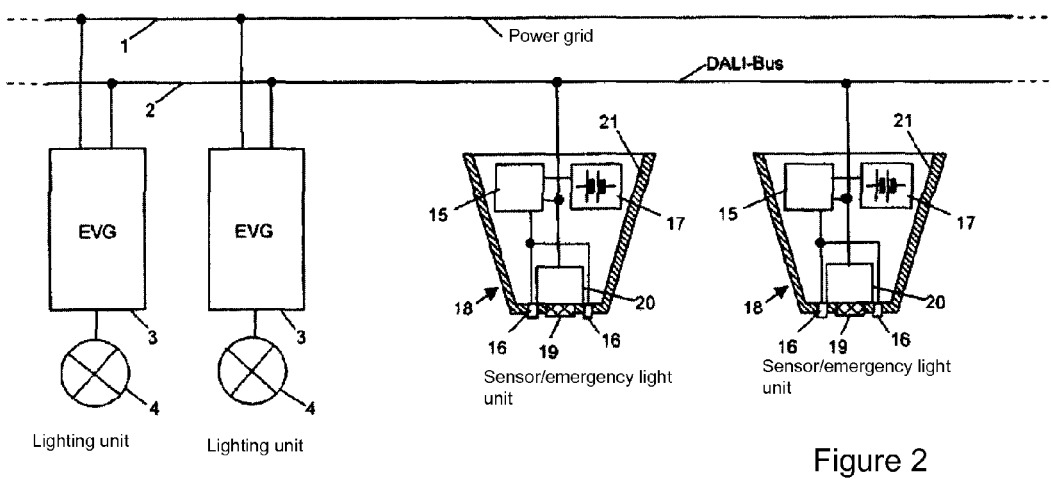
FIG. 2 is an illustration according to FIG. 1, which, however, shows the combined sensor/emergency light units according to the invention.

The lighting system of this invention according to FIG. 2 comprises—similarly to the lighting system according to prior art depicted in FIG. 1—two lighting units which are labeled with the same reference numerals.

Instead of the separately arranged emergency light units and sensor units of FIG. 1, combined sensor/emergency light units 18 are provided as shown in FIG. 2. Each sensor/emergency light unit 18 has a housing 21, wherein the housing 11 may be similar to that of the sensor units 8 shown in FIG. 1. This housing 21 is for example a hollow body, which is opened upward and which preferably has the form of a truncated cone tapered in the downward direction. It is designed for attachment to the ceiling of the room to be monitored and illuminated. In the cavity of each housing 21 is located one emergency light unit 15, one sensor module 20 and one rechargeable storage unit 17 for storage of electrical energy. Each optical sensor 19 is engaged through the bottom wall of both housings 21 and connected with the associated sensor module 20. Similarly to the emergency light 15, the sensor module 20 is further also connected, preferably electrically, to DC current with the bus 2.

The function of the sensor module 20 can either be realized with only a single sensor, or with a combination of different sensors, for example with a combination of a light sensor, a presence detecting sensor, a movement detecting sensor and/or a sensor for an IR interface (infrared interface). The sensor module 20 thus forms a control device which can preferably communicate according to the DALI standard.

The emergency light unit 15 of each sensor/emergency light 18 is further connected with the rechargeable storage unit 17 for electrical energy. The emergency light unit 15 contains a drive circuit for controlling the emergency light means (LED(s) in the example) 16, namely for supplying current to the LED 16, which is supplied from the rechargeable storage unit 17 for supplying electrical energy. The optical sensor 19 is surrounded by four LEDs 16, which create an annular form around each of the sensor/emergency light units and which are respectively arranged on a substrate plate 14. The drive circuit for controlling the emergency lighting means 16 can be formed with a switching regulator, but also with a linear regulator. As an option, this drive circuit can be realized with a separate potential. Additionally, the emergency light unit 15 can also be electrically isolated and be provided with a charging circuit having and for example a transformer. The charging circuit for charging the rechargeable storage unit 17 and the drive circuit for controlling the emergency light means can be also designed with a bidirectional switching regulator so that charging of the rechargeable storage unit 17 and/or controlling of the emergency light means can be performed independently of the operating mode.

Figure 3:
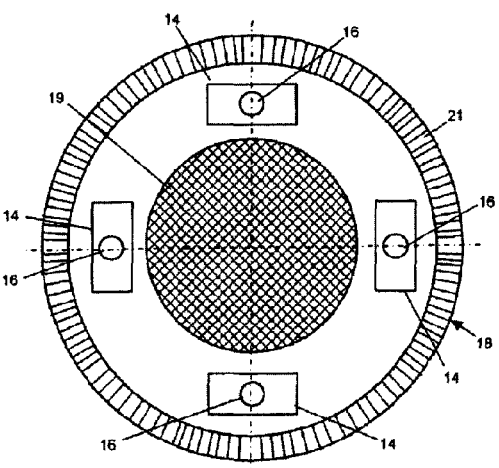
FIG. 3 shows a bottom view of one of the combined sensor/emergency light units according to the invention indicated in FIG. 2.

This arrangement is best shown in FIG. 3. However, the housing 21 of the sensor/emergency light unit 18 can be also provided with a different shape, for example so that it is formed in the shape of a pyramid or a with a hemispherical shape.

One difference between the lighting systems according to FIG. 1 and FIG. 2 is that the emergency light unit 15 of the sensor/emergency light units 18 in FIG. 2 is connected with the bus 2 in such a way so that the storage device for electrical energy can preferably be charged without potential isolation and without rectification based on the DC voltage of the bus.

No power supply for electrical energy is therefore required to charge the storage device and the sensor/emergency light unit according to the invention is therefore preferably not provided with a connection for power voltage.

The rechargeable electrical energy storage device 17 in FIG. 2 draws its energy for recharging from the DALI bus 2. The sensor/emergency light unit 18 is equipped with at least one emergency light means 16 (preferably at least one LED), one emergency light unit 15 and one rechargeable storage device 17 for electrical energy, adapted to supply electrical energy at a low-voltage supply connection, based on DC bus voltage (the DALI bus 2) and preferably without potential isolation for charging of the rechargeable storage device 17 for electrical energy. The sensor/emergency light unit 18 is therefore designed to be supplied with electrical energy for charging of the rechargeable storage device 18 based on the DC voltage of the bus 2 via a low-voltage power voltage supply connection.

The emergency light unit 15 is provided with at least one drive circuit and it is designed to monitor the voltage on the low-voltage power voltage supply connection and to evaluate a long-term failure of voltage as an emergency light situation and activate the lighting means 16 accordingly. The low-voltage power voltage supply connection is in this case connected with the DALI bus 2.

Alternatively or additionally, a central control or a control device can also send an instruction on the DALI bus 2 to switch to the emergency light situation, for example when the device detects a voltage failure. It is for example possible that the voltage on the DALI bus 2 can be continued for a short period of time since it is supplied from an energy storage device which can for a certain period of time still supply energy to power the DALI bus 2.

When an appropriate selection of the LEDs 16 is found, to the effect that a relatively small current is needed with a high brightness of the lamp, and when in addition the number of the sensor/emergency light units is limited to a certain number, it is possible to make energy available for the rechargeable storage unit 17 within 24 hours from the DALI bus 2, in particular with a charging current which is higher than 2 mA. This is permissible because the increased current consumption for the sensor unit is allowed as it will be classified as "DALI control device".

An appropriate selection must be also made with respect to the rechargeable storage unit 17 so that the four LEDs 16 could illuminate the monitored space to a sufficient extent in the case when an emergency light is required. A rechargeable battery is particularly suitable for the rechargeable storage device 17, for example a pack of NiMh battery cells or of Li-ion cells. The rechargeable storage device (17) for electrical energy can also consist of a pack of single cell batteries.

Moreover, the rechargeable storage device 17 can be also arranged outside of the sensor/emergency light unit 18 so that less space will then be required for the device.

In this case, the rechargeable storage device 17 can be electrically connected with the sensor/emergency light unit 18.

Since the new combined sensor/emergency light unit 18 does not necessarily require a connecting power line, greater freedom is provided with respect to its positioning in the monitored space. Last but not least, by combining together two actuators, the manufacturing and assembly costs are reduced since only a single element will then be used.

Optionally, it is also possible to perform monitoring of the combined sensor/emergency light unit 18 in case of an emergency situation through the sensor module 20. In this case, the results of this monitoring can be for example also stored and the corresponding signals on the DALI bus 2 can be forwarded after the end of the emergency situation to the other components sharing the bus. For example, the sensor module 20 could be provided with an IR interface and the communication could thus be performed for instance through the IR interface in case of an emergency. It would be also possible for example to forward the instructions received through the IR interface after the end of the emergency situation. Continuous monitoring by means of the combined sensor/emergency light unit 18 is thus possible also in an emergency situation and recording of the history of the monitoring can be also performed through the sensor module 20.

The emergency light means 16 can be also used for other purposes than emergency illumination. It can be used for example for addressing the combined sensor/emergency light unit 18 (for example by flashing to confirm address assignment or to output assigned address with encoding), but it could be also used to confirm signal reception (for instance by flashing) or for illumination outside of the emergency light situation (as will be described in the next example).

According to another embodiment, the emergency light unit 15 can be also provided with a connection for the AC power grid 1. This can be used for example for faster recharging of the rechargeable storage unit 17, for detecting an emergency situation (i.e. when no emergency situation is present but supply voltage is applied at the AC power grid 1). Combined recharging can be also enabled through the bus 2 as well as through the AC power grid 1. This can be required for instance when the AC power grid is switched off for a long period of time but the DC bus voltage of the bus 2 is maintained, for example in the standby operating mode (idle mode). However, it is also possible that the energy which is consumed by the bus 2 only, or works against a faster charging of the rechargeable storage device 17.

This may be the case when only one relatively small current is used for charging of the rechargeable storage device 17, which, however, is not sufficient to prevent or at least delay quick discharging or even complete discharging of the rechargeable storage device 17. The emergency light unit 15 is for example provided with a combined charging circuit which has inputs for connecting to the bus 2 and to the power grid 1, or two separate charging circuits can be provided. A similar emergency light unit 15 can be combined with a sensor module 20 (provided directly in a housing, or only in the form of an electrical or communication line) and a combined sensor/emergency light (18) can be also formed in this manner.

What is claimed is:

1. An emergency light system comprising:
  a combined sensor/emergency light unit (18), the combined sensor/emergency light unit comprising:
    at least one emergency light means (16),
    one emergency light (15) unit, and
    one rechargeable storage device (17) for electrical energy, wherein the emergency light unit (15) is adapted to supply electrical energy to a low-voltage power supply connection, from DC bus voltage, for charging the storage device (17) with electrical energy;
  a bus (2), which supplies DC voltage in standby state; and
  a bus signal generator, which is connected to the bus (2) and which further loops the bus voltage to the integrated or separately provided emergency light unit (15).

2. The emergency light system according to claim 1, wherein the emergency light unit (15) is adapted to monitor the voltage at the low-voltage supply connection and to evaluate a long-term voltage failure as an emergency light situation and accordingly to activate the emergency lighting means (16).

3. An emergency light unit (15) for a lighting system, which is connected to a bus (2) of the lighting system, and to a rechargeable storage device (17) for electrical energy and to an emergency lighting means (16), wherein current from the bus (2) can be supplied for recharging to the storage device (17) and wherein the emergency light unit (15) is integrated or connected with a bus-capable sensor module control device (20).

4. The emergency light unit (15) according to claim 3, wherein the emergency light unit is arranged together with: the control device (20), the storage device (17) for electrical energy, and the emergency light means (16) in a joint housing (21).

5. The emergency light unit (15) according to claim 3, further comprising sensor optics (19) and wherein a cavity is provided in the housing (21) which is opened at a top portion thereof for attachment to a ceiling for illumination of a specific area, so that the sensor optics (19) and an emergency lamp (16) protrude from a bottom side thereof.

6. The emergency light unit (15) according to claim 5, wherein the housing (21) is a rotationally symmetrical body, and the sensor optics (19) are arranged in a central position and surround by a plurality of LEDs (16) in an annular shape forming the emergency light.

7. The emergency light unit (15) according to claim 3, wherein the storage device (17) for electrical energy is a rechargeable battery.

* * * * *